United States Patent

[11] 3,560,751

[72] Inventors Donald L. Buettner
Subiaco, Australia;
John R. Burchfiel, Jr.; Norman D. Kline;
Michael J. Sheehan; Kenneth L. Thompson,
Rochester, Minn.
[21] Appl. No. 797,544
[22] Filed Feb. 7, 1969
[45] Patented Feb. 2, 1971
[73] Assignee International Business Machines Corporation
Amonk, N.Y.
a corporation of New York

[54] OPTICAL MARK SENSING DEVICE
7 Claims, 4 Drawing Figs.

[52] U.S. Cl. .......... 250/214,
235/61.115, 250/219, 307/211, 307/235
[51] Int. Cl. .......... H01j 39/12
[50] Field of Search .......... 250/219IDC,
219ID, 214; 235/61.115; 307/235,
211

[56] References Cited

UNITED STATES PATENTS 3,131,316 4/1964 Glaz .......... 235/61.115X
3,189,745 6/1965 Van Reymersdal .......... 250/219IDCX
3,248,553 4/1966 Patterson .......... 235/61.115X
3,253,128 5/1966 Chen et al. .......... 250/219IDCX
3,360,635 12/1967 Wolf et al. .......... 235/61.115
3,395,963 8/1968 Ackerman .......... 250/219IDC
3,461,303 8/1969 Hanson .......... 250/219IDC

OTHER REFERENCES

Cook, " Optical Card Lever," IBM Technical Disclosure Bulletin, Vol. 3, No. 3, Aug. 1960, p. 20.

*Primary Examiner*—James W. Lawrence
*Assistant Examiner*—C. M. Leedom
*Attorneys*—Hanifin and Jancin and Robert W. Lahtinen

ABSTRACT: The invention pertains to an optical mark reading device which uses collinated light directed toward a document path with light reflected to and intercepted by a phototransistor array to yield signal currents. The current signal is converted to a voltage in the amplifier which is sensed by a comparator circuit that stores a voltage level representative of background illumination and emits the signal upon the occurrence of a proportional reduction of light level indicative of a mark in the sensing area.

INVENTOR
DONALD L. BUETTNER
JOHN R. BURCHFIEL, JR
NORMAN D. KLINE
MICHAEL J. SHEEHAN
KENNETH L. THOMPSON

BY. Robert W. Lahtinen

OPTICAL MARK SENSING DEVICE

BACKGROUND OF THE INVENTION

In prior art mark sensing devices it has been common to establish a fixed threshold or switching point. In such an environment, variations in the parameters affecting the device must be either tolerated or normalized by adjustment. The signal is normalized by a series of adjustments such as the gain of a linear amplifier, the intensity of a light source or a plurality of individual sources and the ambient temperature. The drawbacks of the previous approaches reside not only in the multiplicity of individual adjustments which must be made, but in the fact that subsequent readjustments must be made periodically to accommodate degradation of the light source and circuit components particularly the photosensing device. In addition regular maintenance is critical since such ambient conditions as card dust or other deposits can compromise the optics and signal strength.

SUMMARY

In the device of the present invention a highly collimated light source is masked through a tubular structure to yield collimated light confined to a discrete, limited area on the document. Reflected light is sensed by a phototransistor with the current signal therefrom converted to a corresponding voltage signal and supplied to a pair of comparator circuits. The voltage level associated instantaneously with the background intensity is stored in a capacitive memory and a mark is indicated upon sensing a predetermined proportional drop from the thus established background value. To discriminate between marks and spurious signals the second of the comparator circuits identifies signals indicative of a proportional drop intermediate the background voltage and the mark value. Any signal failing to drop below the intermediate value is disregarded leaving only those signals falling within the span between the intermediate and mark values as possible error conditions.

Use of a variable threshold or percentage change makes the device insensitive to variations of signal over a wide range. Consequently degradation of components through age; compromising the signal because of dust or foreign particles; or variation ambient temperatures, light intensities across the field of sensing locations, supply voltage changes or varying characteristics of individual sensing devices do not have an adverse effect upon the sensing function. Additionally, the presence of paper stock having various surface colors and textures can be tolerated without detriment to the readability of the mark thereon if the mark to background ratio is maintained.

The light source and sensing element array is disposed beneath the card path with a transparent element forming the card path portion extending across the sensing field. The cards continuously wipe over this transparent element during passage by the sensing station and provide a self-cleaning action to maintain the intensity of the light striking the card surface without any significant maintenance. In addition positioning the mark read sensing station below the card path allows normal card sequencing, that is, face down with the nine edge or lower edge of the card toward the inner edge guide surface.

The device does not utilize fibre optics and thereby achieves the lower cost and increased reliability that accompany the use of fewer components. Further a single lamp is utilized with multiple channels while the individual channels are balanced by a simple D.C. adjustment. The sensing is accomplished by a silicon phototransistor which receives light from an incandescent source. Since red is transparent in use with this combination printing or marking can be effected in red which permits red constraint markings to be printed on the card or red ink or red pencil markings to be applied to the card surface without impeding the mark reading operation.

DETAILED DESCRIPTION

Figures 1, 2:
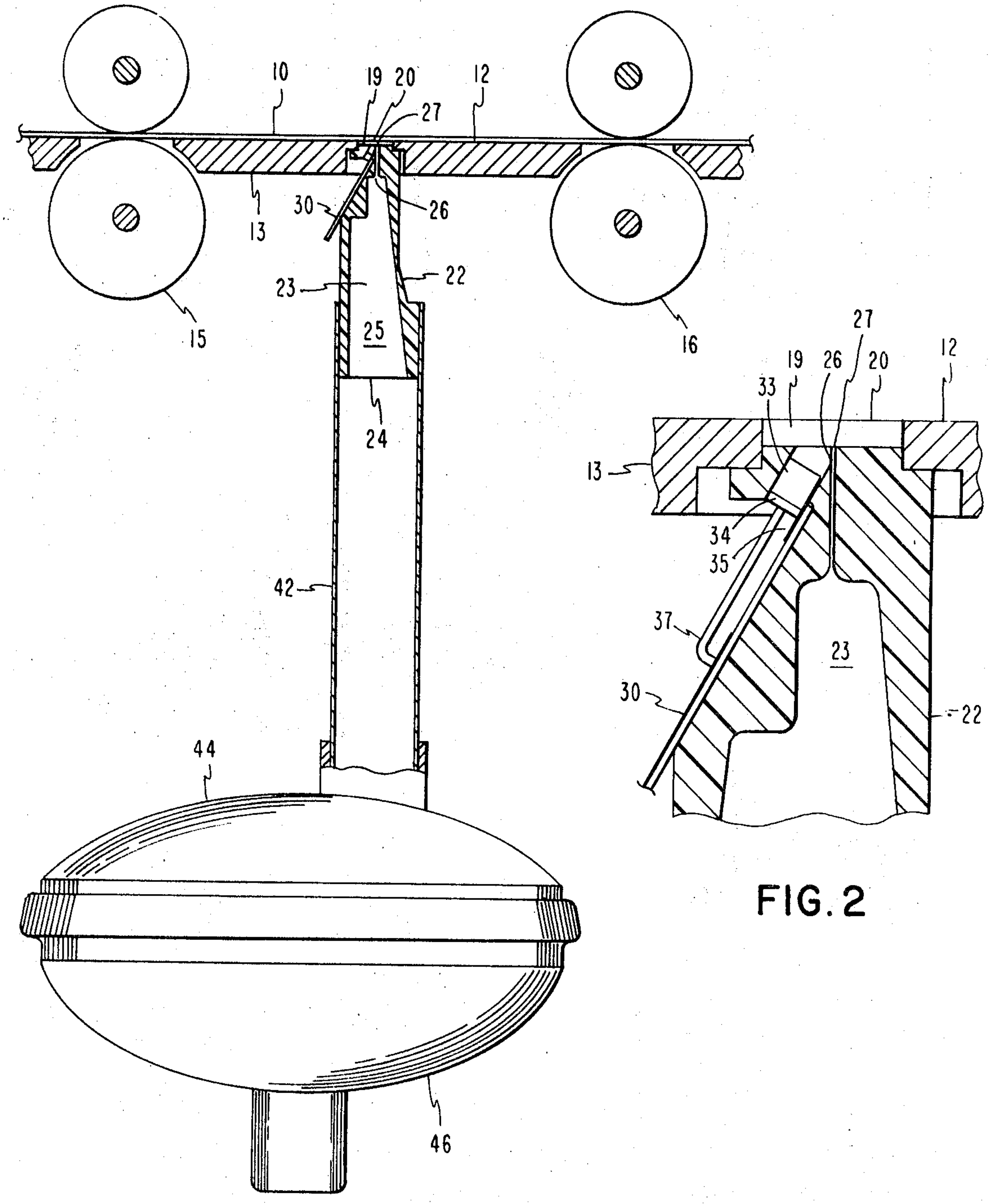
FIG. 1 is a partial side elevation partly in section and partly broken away showing the optical portions of the mark reader of this invention.
FIG. 2 is a partial section of the card bed and the upper portion of the optical mark read head of FIG. 1.

As seen in FIG. 1, a card 10 travels along a document guideway defined by the upper surface 12 of bed plate 13 with the mark field to be sensed facing downward. The document transport is controlled by a series of drive rolls 15, 16. The drive rolls form a part of the machine drive train and rotate in unison through a connecting drive means, not shown, to control transport of a card 10 past the read station. A transparent glass plate 19 has the upper surface 20 thereof coplanar with the bed plate surface 12 to form a part of the card guide path.

Mounted beneath transparent plate 19 is the mark sense read head 22 fabricated of molded plastic which has formed therein a series of passageways 23, numbering 12 in the illustrated embodiment, to provide a high resolution light spot in each row of a standard data card. Each passageway 23 has an enlarged lower opening 24 aligned with a tubular light conveying passage 25 and an upper confined passage 26 to largely absorb or filter all but collimated light rays by limiting the angle of light acceptance prior to emergence from the outlet opening 27. Since the device is required to identify the mark made by the single stroke of a number 2 pencil, which has been found to have a nominal width of .015 inches, the outlet aperture is .020 inches in width which, although somewhat enlarged by the angle of light acceptance to passage 26 and the defraction of light when traveling through the transparent plate 19, yields a light spot having a width of .022 inches. The aperture is wider than the nominal mark for signal strength considerations.

Mounted at one side of the mark read head is a phototransistor array carried by a printed circuit board 30 secured to the read head 22 with each phototransistor 33 respectively positioned to intercept reflected light from a card position illuminated by one spot of collimated light emanating from the read head collimating passage opening 27.

Figure 3:
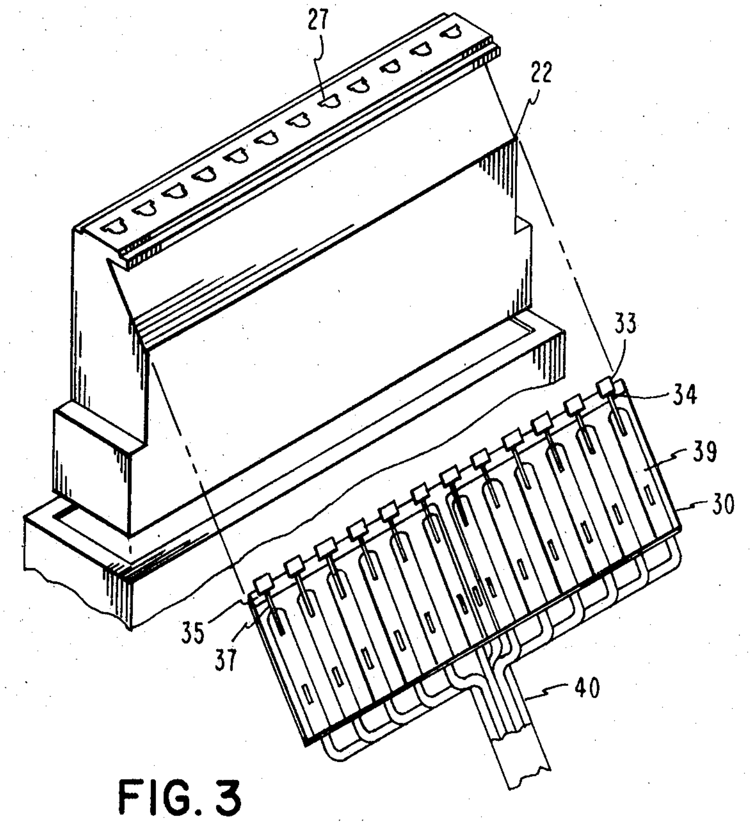
FIG. 3 is an isometric view of the read head transistor array light tube and lamp shroud of FIG. 1 partly broken away and partly in section with the light tube interrupted.

As seen in FIG. 3, each phototransistor 33 is mounted on the printed circuit card 30 with one terminal 34 connected to a common circuit 35 and the lead 37 extending away from the phototransistor body connected to an individual printed circuit conductor path 39. A cable 40 connects the individual phototransistors 33 to the respective amplifier circuits.

The tubular member 42 extends downwardly from the read head to the rectangular outlet of a shroud 44 which covers the lens of the lamp 46 that serves as the light source. Shroud 44 serves to align the light output with respect to the lamp filament and also provide shielding to exclude dust from the lamp. Lamp 46 has a transversely extending filament that is aligned parallel to the shroud opening with the axis of the shroud opening displaced from the axis of the filament to achieve a more uniform light intensity over the transversely extending length of the shroud opening. Lamp 46 is a high intensity parabolic reflector incandescent lamp that is derated to extend filament life.

Reflected light, in the illustrated embodiment at 30° to incident light, is utilized in sensing marks since equal angle light is almost uniformly reflected from either shiny mark or card surface making discrimination between shiny mark and background difficult. The axis of each of phototransistor 33 is inclined 30° to the axis of the normal path of collimated light directed toward the card. This angle provides a suitable compromise between the signal or light amplitude maximized by a specular relationship and the contrast ratio.

Figure 4:
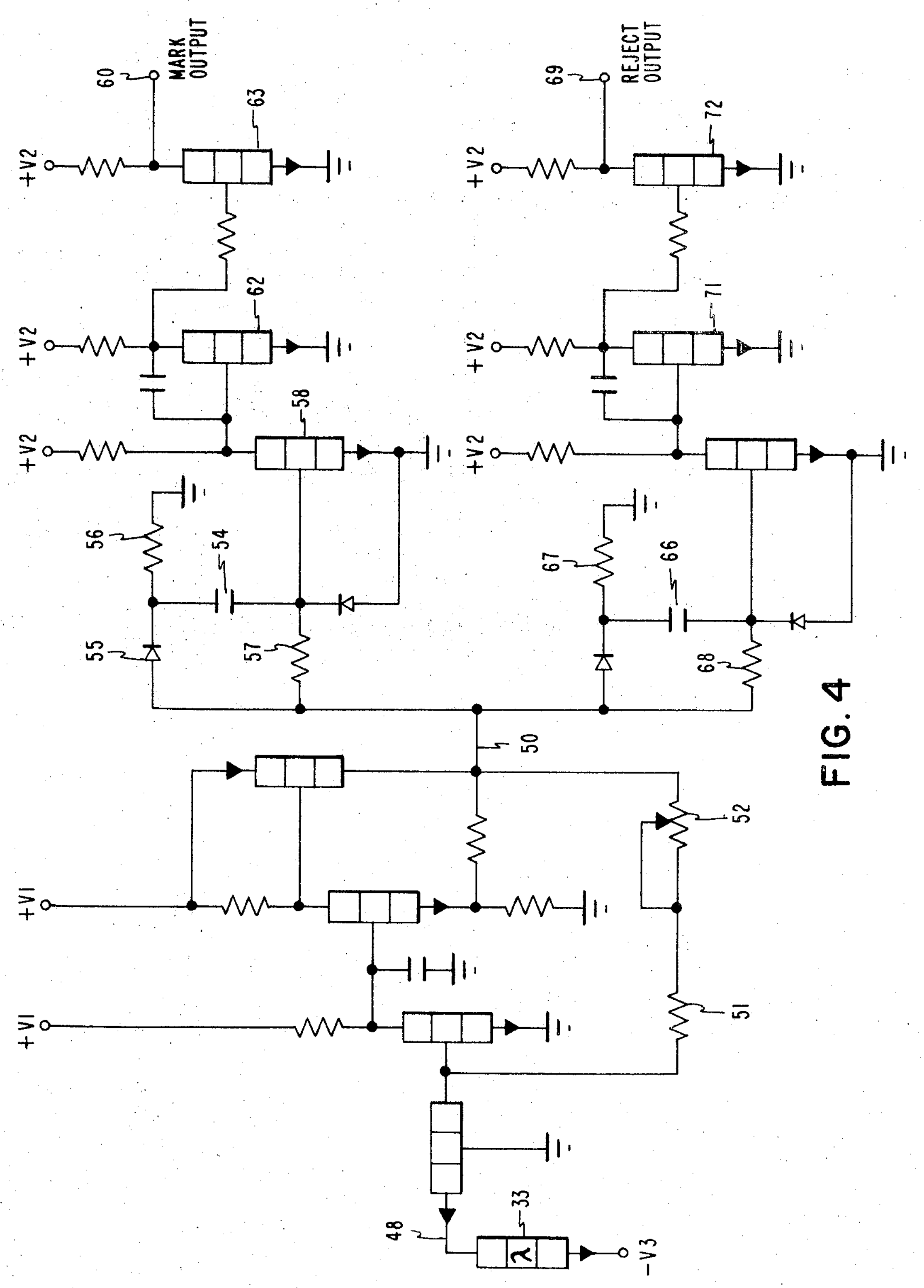
FIG. 4 is a schematic wiring diagram of a phototransistor preamplifier and comparator circuit for generating output signals utilized in the mark reader of the present invention.

Each phototransistor 33 has a current output at 48 (FIG. 4) which is converted in the current to voltage preamplifier portion of the amplifier circuit to a voltage output at 50. The voltage output 50 is substantially the product of the current input multiplied by the resistance wherein the resistance is equivalent to the sum of the fixed resistor 51 and the variable resistor 52. The voltage output 50 corresponding to the background charges capacitor 54 which accordingly stores a voltage indicative of the background reflected light level sensed. When a mark appears at the sensing location and voltage output 50 drops whereupon capacitor 54 back biases diode 55 and maintains the voltage at the positive side of resistor 56 (the duration of the passage of the mark being short in comparison to the decay time of the capacitor charge). When the current passing through resistor 57 becomes equal to or less than the current through resistor 56 the net current delivered to the base of transistor 58 drops to 0 causing the transistor stage to turn off and give a logical 1 output. Accordingly the ratio of the resistance 56 to the resistance 57 determines the proportional reduction in signal intensity which will cause an output at the collector of transistor 58 and the mark output 60.

Since the voltage stored by the capacitor 54 is the output of the preamplifier corresponding to the reflected light sensed from the card surface and the output 60 from the switching circuit is based upon a proportional reduction of the voltage stored by the capacitor 54, the specific voltage level stored has little significance upon the operation of the sensing device. Accordingly, the system is extremely tolerant of variations due to lamp or transistor component degradation, the ambient temperature, or the reflective qualities of the card stock. The system functions from the minimum acceptable signal to a condition saturation of the preamplifier. To make the system more effective potentiometer 52 is provided which is initially set to normalize or balance the channels to give the same voltage output irrespective of the current input 48 and also to maximize the ability of the system to accept degradation and appreciation of components.

In order to have an output of sufficient strength to drive the logic circuit of the associated device a pair of inverting amplifier stages 62 and 63 are utilized to yield a stronger signal with the proper phase.

A similar comparison circuit is provided by capacitor 66 in cooperation with resistances 67 and 68 which gives rise to an output at the reject output 69 amplified by the transistor amplifying stages associated with transistors 71 and 72 when a voltage signal at the preamp output 50 occurs which is instantaneously reduced in amount below the ratio of the resistance of 68 with respect to resistance 67.

The ratio of resistance 68 to resistance 67 is a second comparative value which produces an output at terminal 69. Such second comparative value is representative of a sensed light intensity intermediate the background level and the first comparative value established by the ratio of resistance 57 to resistance 58 which is indicative of a mark and provides an output signal at terminal 60. Any reduction of light intensity and consequent voltage drop below the first comparative value is indicative of a mark, while any signal failing to drop below the intermediate, second comparative value is disregarded. Signals falling below the intermediate value, but failing to fall below the first comparative value to be indicative of a mark, are identified as errors.

In the illustrated embodiment, silicon phototransistor 33 cooperates with light from an incandescent source to ignore red colored markings. Accordingly the constraint marks printed on the card to indicate the location where marks may be selectively placed and any instructional or informational material may be printed in red and any information may be entered on the card face using common red pencils or pens without impairing the mark sensing function.

We claim:

1. A device for sensing marks on continuously feeding records which have marked positions located along the intersections of rows and columns extending over the document surface with a sensing station forming a portion of the document guide path extending transversely across such guide path comprising;

a plurality of light collimating means for directing beams of collimated light toward a document at said sensing station which intercept such document at respective sensing locations corresponding respectively to each document row in which a mark to be sensed may occur;

separate photosensing means respectively associated with each such row and mounted to receive reflected light from a document surface originating from one of said collimated light beams;

amplifier means associated with each of said photosensing means including first and second variable threshold switching means for respectively generating second and third output signals upon respectively sensing first and second proportional reductions in the level of reflected light sensed by said photosensing means;

said second proportional reduction being indicative of a value of sensed light intensity intermediate the initial value and that indicated by said first proportional reduction;

whereby the coincidence of said second and third output signals indicates that data has been sensed, the absence of both second and third output signals indicates the absence of data and the occurrence of said third output in the absence of said second output indicates a detected error.

2. The device of claim 1 wherein said document path is positioned to present a document passing said sensing station in a substantially horizontal attitude and said light source and said photosensing means are disposed below said document path.

3. The device of claim 1 wherein each said variable threshold switching means comprises:

a capacitor which is charged in accordance with the level of light intensity sensed from the document background;

means for restraining decay of the charge of said capacitor when the output of the associated photosensing means changes indicating a drop in the intensity of reflected light sensed; and plural impedance means interconnected with each said capacitor and with relative values to initiate said second output signal upon sensing a predetermined proportional drop in said sensed light level.

4. The device of claim 1 wherein each of said plurality of light collimating means receives light from a single incandescent source and communicates therewith at a location transversely offset from the filament thereof.

5. A device for sensing marks on a document feeding past a sensing station comprising:

a source of collimated light;

photo sensing means including preamplifier means for intercepting reflected light from said document at said sensing station and operative to generate a first electrical output proportional to the intensity of light sensed;

first comparator means connected to said photo sensing means to receive said first electrical output, said first comparator means being operative to store a signal indicative of the value of said first electrical output and generate a second output signal upon a first predetermined proportional reduction of said first electrical output; and second comparator means connected to said photo sensing means to receive said first electrical output, said second comparator means being operative to store a signal indicative of the value of said first electrical output and generate a third output signal upon a second predetermined proportional reduction of said first electrical output, said second predetermined proportional reduction being a value intermediate said first signal and said first predetermined proportional reduction.

6. The device of claim 5 wherein said source of collimated light comprises a shrouded tubular light confining passageway having a terminal collimating portion of substantially constant cross section, said passageway originating adjacent an incandescent light source offset from the axis thereof and terminating closely adjacent said sensing station.

7. The device of claim 6 wherein said collimating light is directed substantially normal to a document being fed past said sensing station and said photosensing means is positioned along an axis having an angle of inclination not exceeding 45° with respect to the path of said collimated light.

PO-1050
(5/69)

UNITED STATES PATENT OFFICE
CERTIFICATE OF CORRECTION

Patent No. 3,560,751 Dated February 2, 1971

Inventor(s) Donald L. Buettner et al

It is certified that error appears in the above-identified patent and that said Letters Patent are hereby corrected as shown below:

Column 4, after line 3, insert --a light source;--

Signed and sealed this 18th day of May 1971.

(SEAL)
Attest:

EDWARD M.FLETCHER,JR.
Attesting Officer

WILLIAM E. SCHUYLER,JR.
Commissioner of Patents